United States Patent
Lohe et al.

[11] Patent Number: 5,814,282
[45] Date of Patent: Sep. 29, 1998

[54] HIGH SURFACE INTERMESHING PROFILE REACTOR

[76] Inventors: Hans Lohe, Kiefernweg 18/D-61476, Kronberg; Hartmut Hey, Beethovenring 23/D-55283, Nierstein, both of Germany; Gordon Shaw, 6947 Candlewyck La.; W. Jeffrey Stikeleather, 6826 Windyrush Rd., both of Charlotte, N.C. 28226

[21] Appl. No.: 784,167

[22] Filed: Jan. 15, 1997

[51] Int. Cl.[6] .............................. C08F 5/02; B32B 19/02; C08G 63/02

[52] U.S. Cl. ..................... 422/135; 422/137; 422/224; 422/225; 366/83; 366/85; 366/97; 528/272; 528/308.1

[58] Field of Search ..................... 422/135, 137, 422/224, 225; 366/83, 85, 97; 528/272, 308.1

[56] References Cited

U.S. PATENT DOCUMENTS

| | | | |
|---|---|---|---|
| 3,057,702 | 10/1962 | Pierce et al. ................................ | 23/285 |
| 3,248,180 | 4/1966 | Kilpatrick .................................. | 23/285 |
| 3,440,019 | 4/1969 | Albrecht et al. ........................... | 23/285 |
| 3,591,344 | 7/1971 | Schnock et al. ........................... | 23/285 |
| 3,630,689 | 12/1971 | Wheeler et al. .......................... | 422/135 |
| 3,684,458 | 8/1972 | McCammon et al. ................... | 422/135 |
| 4,343,929 | 8/1982 | Sugio et al. .............................. | 528/241 |
| 4,438,072 | 3/1984 | Nothnagel ............................... | 422/133 |
| 4,801,433 | 1/1989 | Yamanaka et al. ....................... | 422/228 |
| 5,055,273 | 10/1991 | Wilhelm et al. ......................... | 422/135 |
| 5,358,693 | 10/1994 | Brinkmann et al. ..................... | 422/137 |
| 5,510,073 | 4/1996 | Kaegi et al. ........................ | 264/211.23 |

*Primary Examiner*—Nina Bhat
*Attorney, Agent, or Firm*—Gregory N. Clements; Walter M. Douglas

[57] ABSTRACT

A polycondensation reactor for polyesters, polyamides or polyarylates, for example, in which a low viscosity material is introduced into the reactor and a relative high viscosity polymer exits the reactor. The reactor has at least two longitudinally intersecting cylindrical interior chambers, each with a rotating shaft through its length. Each shaft has a plurality of stirrers and spacers designed to wipe all interior surfaces of the reactor. The stirrers can be shaped as a cycloid or involute profile, for example. Generally the stirrers on each shaft are indexed from one another preferably by 90° and intermesh with stirrers on the adjacent shaft. Stirring the low viscosity material by rotating the stirrers (on the shafts) spreads the material into a plurality of thin films. At the temperature and vacuum conditions of the reactor, a volatile component is removed, thus causing the material to polymerize, by condensation, forming a relatively high viscosity polymer.

14 Claims, 11 Drawing Sheets

HIGH SURFACE INTERMESHING PROFILE REACTOR

BACKGROUND OF THE INVENTION

1) Field of the Invention

This invention relates generally to an apparatus for converting a liquid of low viscosity into a liquid of high viscosity. In particular, the present invention concerns a reactor especially suitable for polycondensation reactions in which a volatile component is removed and a polymeric material of high viscosity is produced while remaining in a liquid state within the reactor. Most specifically, this invention relates to an apparatus for affecting polycondensation to make polyesters, copolyesters, polyamides or copolyamides. A common polyester is polyethylene terephthalate. A common polyamide is nylon.

2) Prior Art

The commercial preparation of most linear condensation polymers, such as polyesters or polyamides, involves heating monomeric starting materials to cause progressive condensation with removal of low molecular weight volatile material until the desired molecular weight level of the polymer is achieved. For example, polyethylene terephthalate, is typically formed from reacting ethylene glycol and either terephthalic acid or its ester equivalent—dimethyl terephthalate: either reaction forms the monomer bis-2-hydroxyethyl terephthalate, as well as other low molecular weight species. By heating the monomer to proper temperatures, generally with increasingly low pressures, the monomer polymerizes with evolution of ethylene glycol until the desired fiber or film forming viscosity desired is achieved. The process is usually carried out in two or more stages with intermediate formation of a low-molecular weight, low-viscosity polymeric liquid which is then passed through vessels which are maintained at proper temperatures and low pressures to increase the viscosity. These vessels are customarily known as polymer finishers designed to increase the low viscosity polymeric liquid material to a relative high viscosity liquid material. Many of these vessels are "wiped" reactors meaning at least some of the interior reactor surfaces and/or interior components surfaces are "wiped", not by direct contact, but by wiping the liquid on the interior surfaces into a thin film. Such apparatus and process are known from the following U.S. Pat. Nos. 3,057,702; 3,248,180; 3,440,019; 3,591,344; 4,801,433 and 5,055,273.

As polymer technology has advanced, the industry has demanded polymers having more specific characteristics. For example, the industry demands improved yarns having higher tenacity which can only be attained by increasing the viscosity of the polymer. Conventional reactors suffer several disadvantages for higher viscosity polymers, in that these reactors must be excessively large in order to achieve the desired viscosity and therefore are impractical. Primarily, conventional reactors have several disadvantages such that they are less efficient than the apparatus of the present invention. For wiped reactors, film formation is not controlled, i.e., what is formed is formed with no film thickness control. Another disadvantage of some conventional reactors is undesirable polymer collection on the shaft, which creates stagnant areas around the shaft ultimately producing a carbonaceous contaminate within the polymeric material. Likewise, polymer buildup can occur in other stagnant regions within the vessel, such as on the inner vessel walls where such walls are not satisfactorily wiped by an agitator. It is therefore necessary to operate the reactor in a manner to prevent polymer buildup, such as by progressively wiping all interior surfaces of the reactor, including all parts of the shaft(s) stirrers, etc.

Thus there is a need for a reaction vessel for continuous polycondensation of melts, which satisfies the criteria of wiping all interior surfaces of the reactor, as well as achieves the goal of producing a high viscosity polymer.

SUMMARY OF THE INVENTION

The present invention provides a device for continuous polymerization of polymer melts which comprises a heatable, cylindrical, horizontal or almost horizontal reactor provided with an inlet at one end for the introduction of monomeric like materials or low viscosity polymeric materials, at least one outlet at the other end for the polymer melt, and at least one vapor outlet. The reactor contains stirrers for the liquid polymer melt configured to the shape of the reactor, which stir the polymer melt and wipe all interior surfaces of the reactor. The space between each stirrer and between the edge of each stirrer and the wall of the reactors is very small, but it is still wiped by the fluid mechanics of the polymer. Accordingly, wiped-wall reactors of the type disclosed herein do not "wipe" a surface like a windshield wiper, i.e. with contact, but instead, the stirrers or wipers spread the liquid polymer into a plurality of thin films so that the volatile components volatilize quicker and exit the reactor through the vapor outlet. Wiping eliminates the buildup of polymeric carbonaceous material upon stagnate polymer as with conventional reactors. Additionally, the reactor of the present invention achieves a high surface area to reactor volume ratio by spacing the stirrers closely to one another and designing the inner reactor shape to correspond with the "volume" created by the rotating stirrers. The arrangement of the stirrers and the design of the reactor of the present invention are such that there is no blockage during operation by the polymer melt of the vapor flow path.

In accordance with the invention, a plurality of stirrers are affixed on two parallel shafts and are spaced from one another with spacers such that stirrers from one shaft intermesh with stirrers from the other shaft, and the stirrers wipe the polymer melt contact surfaces from one another. Additionally, the stirrers wipe the interior surfaces of the peripheral inner wall of the reactor. The wiping action and the design (e.g. spacing, thickness of stirrers, stirrer profile, etc.) of the stirrers control the film thickness as well as the number of films created. The stirrers of the present invention maximize the surface area to reactor volume ratio without blocking the vapor path with the formed films and without preventing stagnation of the polymer melt, thereby producing a high quality, high viscosity polymer having relatively low or no carbonaceous material therein.

In the broadest sense, the present invention comprises a reactor having a horizontal or nearly horizontal reaction chamber, having at least one inlet for introducing monomeric like materials or low viscosity polymeric materials, and at least one outlet for high viscosity polymer. Within the reactor chamber of the reactor are two rotatable parallel shafts with a plurality of stirrers and spacers fixedly mounted thereon. The stirrers on one shaft intermesh with the stirrers on the other shaft during rotation. The reactor also includes a volatile component outlet.

BRIEF DESCRIPTION OF THE DRAWINGS

Other objects and advantages of the present invention will become apparent upon reading the following detailed description and upon reference to the drawings, in which.

DETAILED DESCRIPTION OF THE INVENTION

Figure 1:
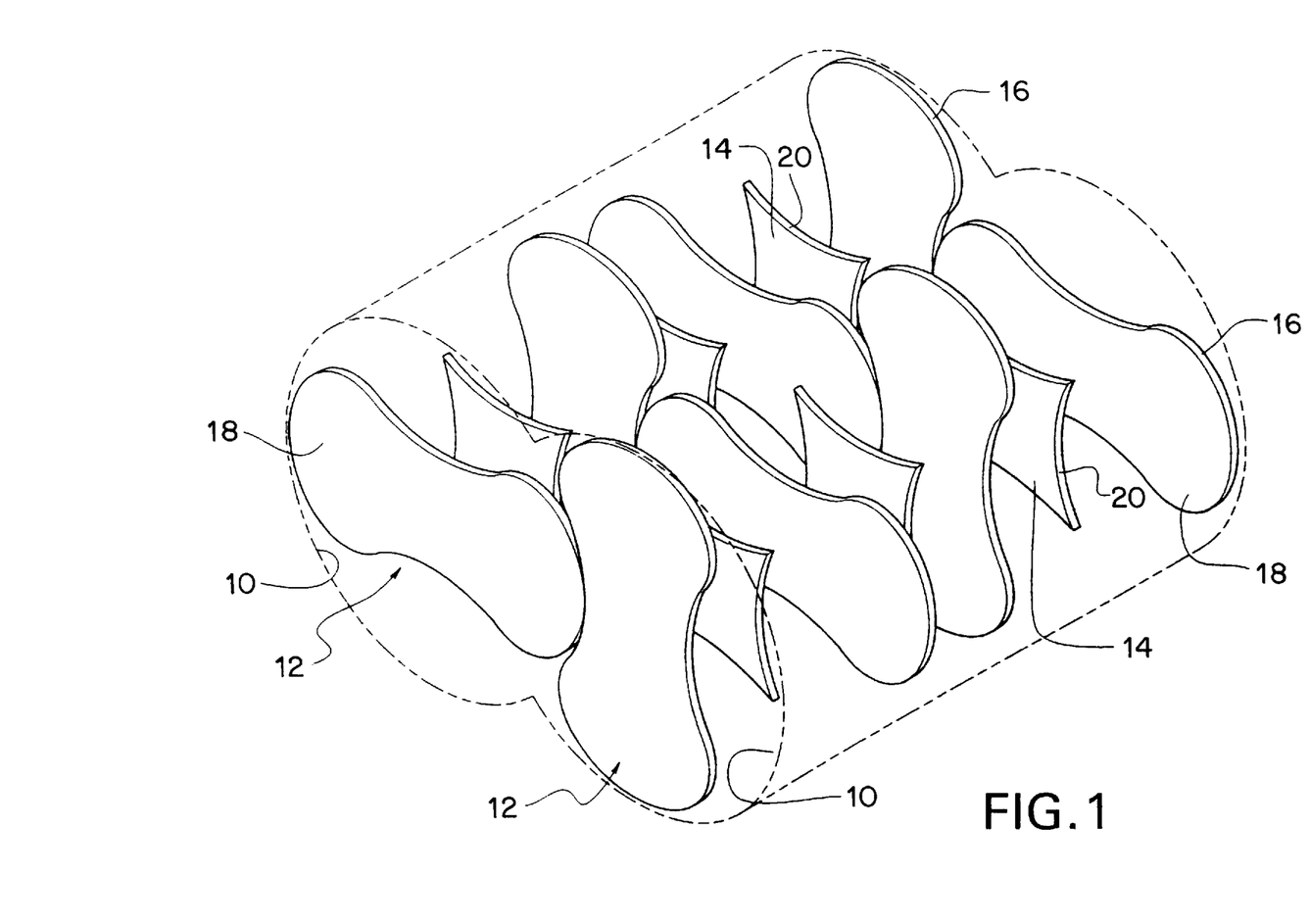
FIG. 1) is a partially perspective, exploded view of the arrangement of the stirrers and spacers within a reactor.

FIG. 1 shows the interior surface profile 10 (i.e., the inner wetted surface) of a reactor indicated in dotted-line with an exploded view of the stirrers 12 and spacers 14. The stirrers 12 and corresponding spacers 14 are shown in two parallel groups, each group being mounted on a shaft (not shown). The two parallel groups of stirrers and spacers rotate, preferably in opposite directions, into and out of the polymer, thereby forming thin films of polymer on each stirrer and on the interior wall of the reactor by the wiping action, which allows the volatile component to more quickly volatilize. It is not only the movement of the stirrers and spacers that wipe the liquid within the reactor into a thin film, but also the fluid mechanics of the liquid in the reactor. In other words, the viscosity of the liquid assists in wiping the various interior surfaces in the reactor by entraining any fluid in the area of a moving surface to move along with such surfaces. While FIG. 1 is an exploded view showing the various components spaced apart, all the stirrers 12 and spacers 14 in one group are actually closely mounted adjacent one another on a rotating shaft (see FIG. 7).

Figure 2:
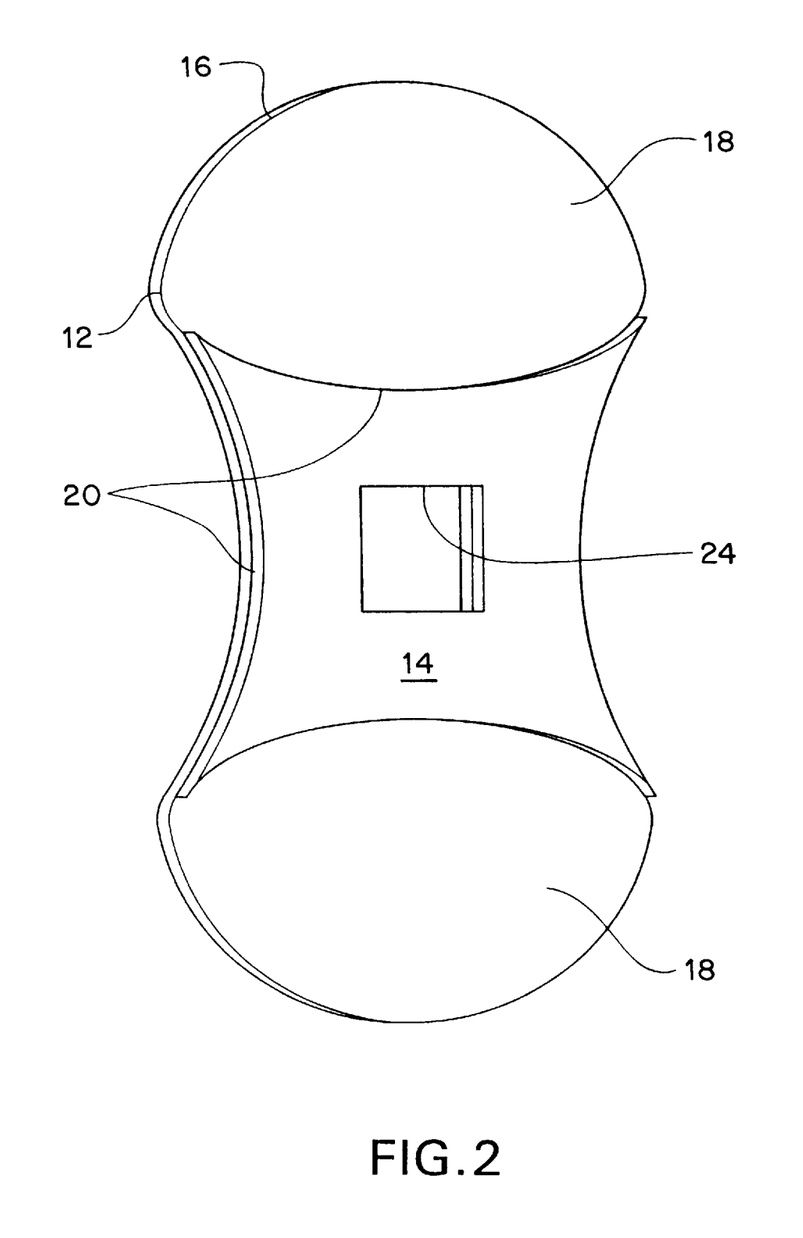
FIG. 2) is an off-set frontal-end view of a cycloid profile stirrer with corresponding spacer.
Figure 3:
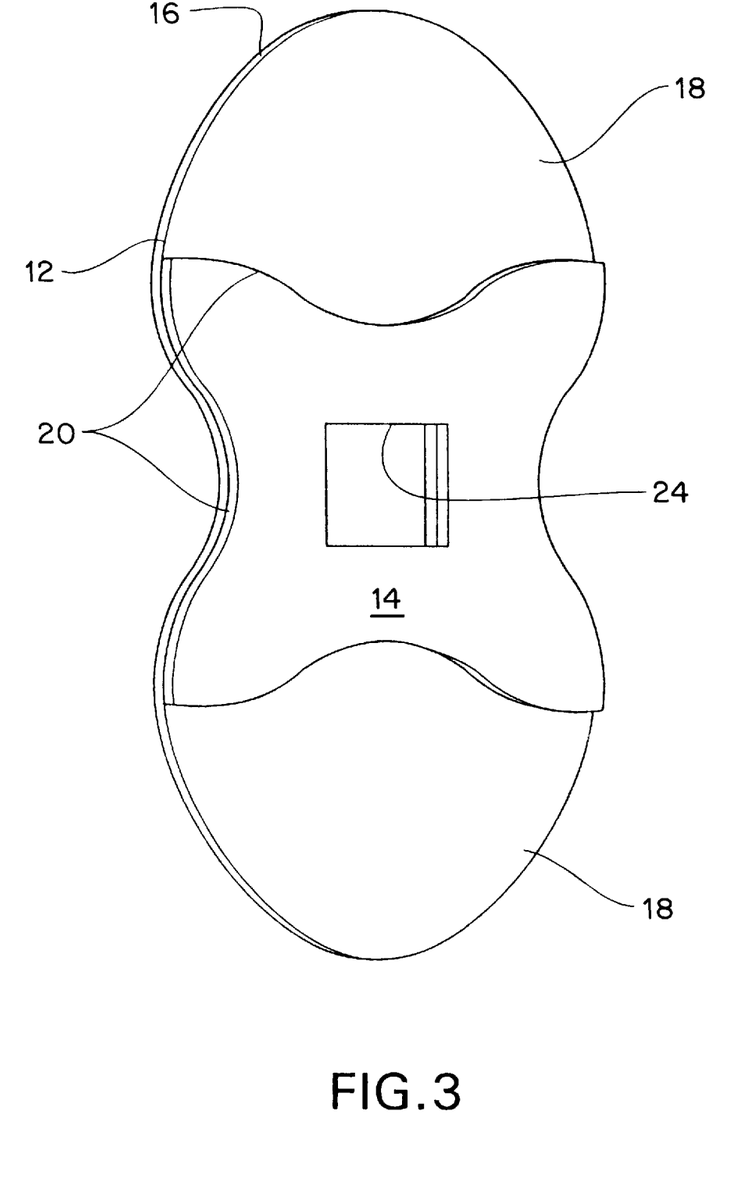
FIG. 3) is an off-set frontal-end view of another stirrer embodiment in the shape of an involute profile.
Figure 8:
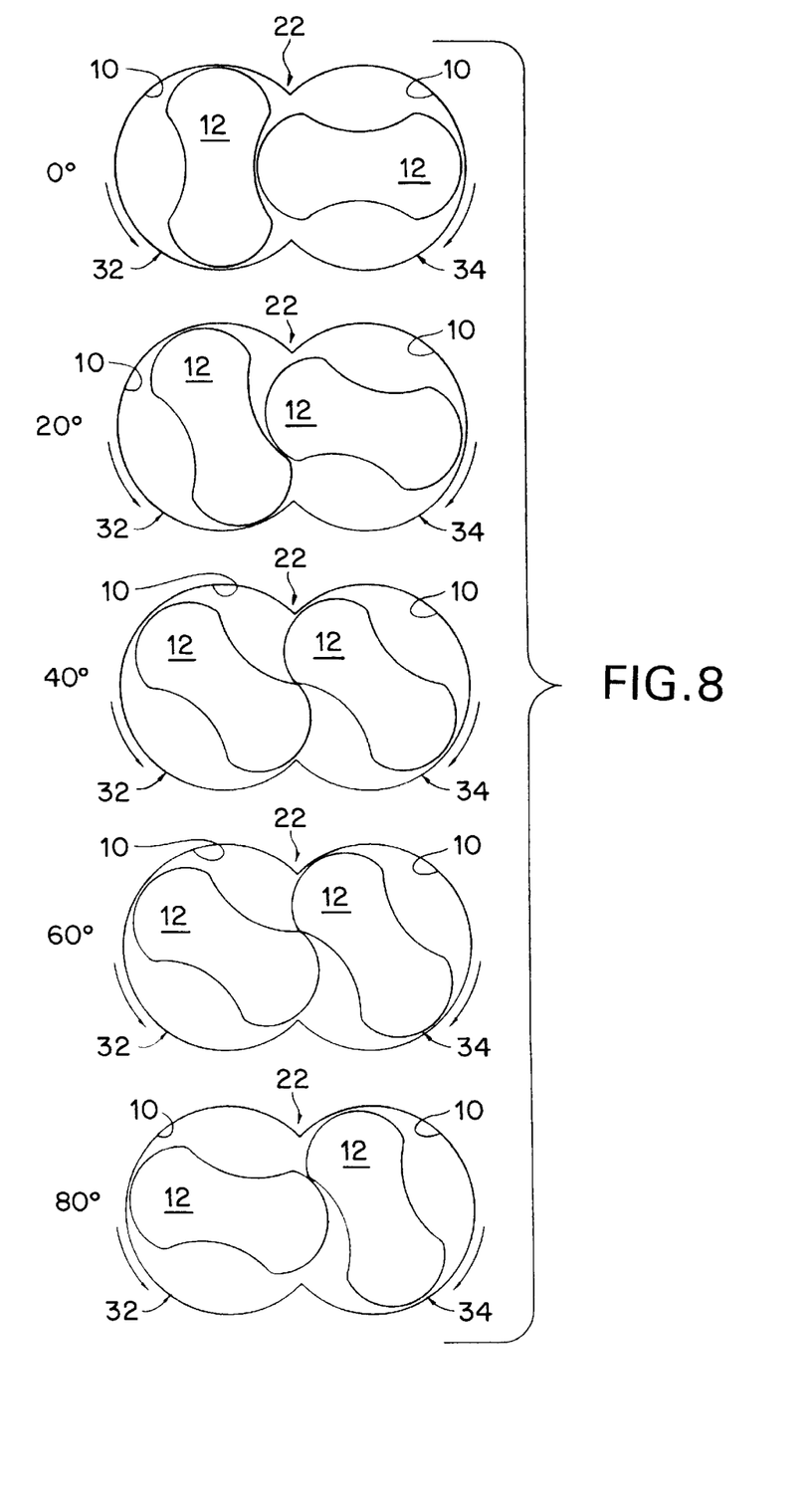
FIG. 8) shows a plurality of stirrers in intermeshing relationship with one another at various degrees of rotation of the parallel shafts.

Turning to FIGS. 2 and 3, two alternative geometric profiles of the stirrers and their respective spacers of the present invention are the cycloid profile of FIG. 2 and the involute stirrer profile of FIG. 3. Both stirrer profiles have the characteristic close spacing along the perimeters of mating stirrer elements upon rotation, as shown in FIG. 8. The peripheral spacing of the stirrers wipes the interior surface 10 of the reactor shell as well as wiping the exposed surface of each stirrer. The reactor shell is wiped by the extreme peripheral edge 16 (also see FIG. 1) of the rotating stirrers, and each face 18 of each stirrer 12 is wiped by the face 18 of an adjacent stirrer, or by reactor end plates 46, 48 (see FIG. 10).

The particular stirrers 12 illustrated in FIGS. 2 and 3 have four faces 18, (2 on the front side, 2 on the back) and an outer peripheral edge 16. Each stirrer 12 can be formed from solid sheet material, or from a foraminous member, or from a combination of these such as the central portion being of solid material and the face formed of foraminous material. For example, the stirrer 12 can be formed from metal, plastic, or composite materials capable of withstanding the reactor temperature, the physical load of the liquid on the rotating stirrers, and being inert to the liquid. If the stirrer 12 or stirrer face 18 is made from foraminous material, such as metallic or plastic screen, the openings (not shown) in the face 18 must be small enough to support the liquid bridging the openings, such that a continuous thin film of liquid is formed on each stirrer face 18 as it rotates out of the polymer liquid. If the openings are too large, the fluid mechanics of the liquid may break (not bridge each opening) such that a continuous thin film is not formed.

Associated with each stirrer 12 is a spacer 14 to space apart each stirrer from another. The spacers 14 are made from a solid material, such as metal, plastic, or composite materials, and positioned tightly against each stirrer 12 (see FIG. 7), thereby preventing liquid from flowing between the spacers and stirrers. Only the stirrer face 18 and its peripheral edge 16, and the peripheral edge 20 of each spacer 14, and the interior surface 10 of the reactor 22, and the interior surface of the end covers 46 and 48 (see FIGS. 8–11) are exposed to the polymer liquid.

Positioned centrally of each spacer 14 and each stirrer 12 is an aperture 24 through which a shaft 26 (see FIG. 7) rotates the stirrers 12 and spacers 14. Note that the spacers 14 do not rotate relative to other stirrers 12 and spacers 14 on the same shaft 26.

FIG. 2 shows the shape of stirrer 12 in an cycloid profile. FIG. 3 shows the shape of the stirrer 12 in an involute profile. Note that the spacer 14 (in both FIGS. 2 and 3) is a quadrilateral member, each edge 20 of which is identically configured. The spacing of the stirrers 12 depend on many factors such as the load of the polymer in the reactor, the rotating speed of the stirrer, the temperature of the reactor, the viscosity of the polymer, etc. The thickness of each spacer 14 depends on the fluid mechanics of the liquid, as well as the structural rigidity of the stirrers 12. If the stirrers 12 are sufficiently structurally rigid and precisely manufactured so that they do not flex or interfere with one another under operating conditions, then the thickness of the spacers depends only on the fluid mechanics of the liquid in the reactor so that a wiping action is achieved.

Figure 4:
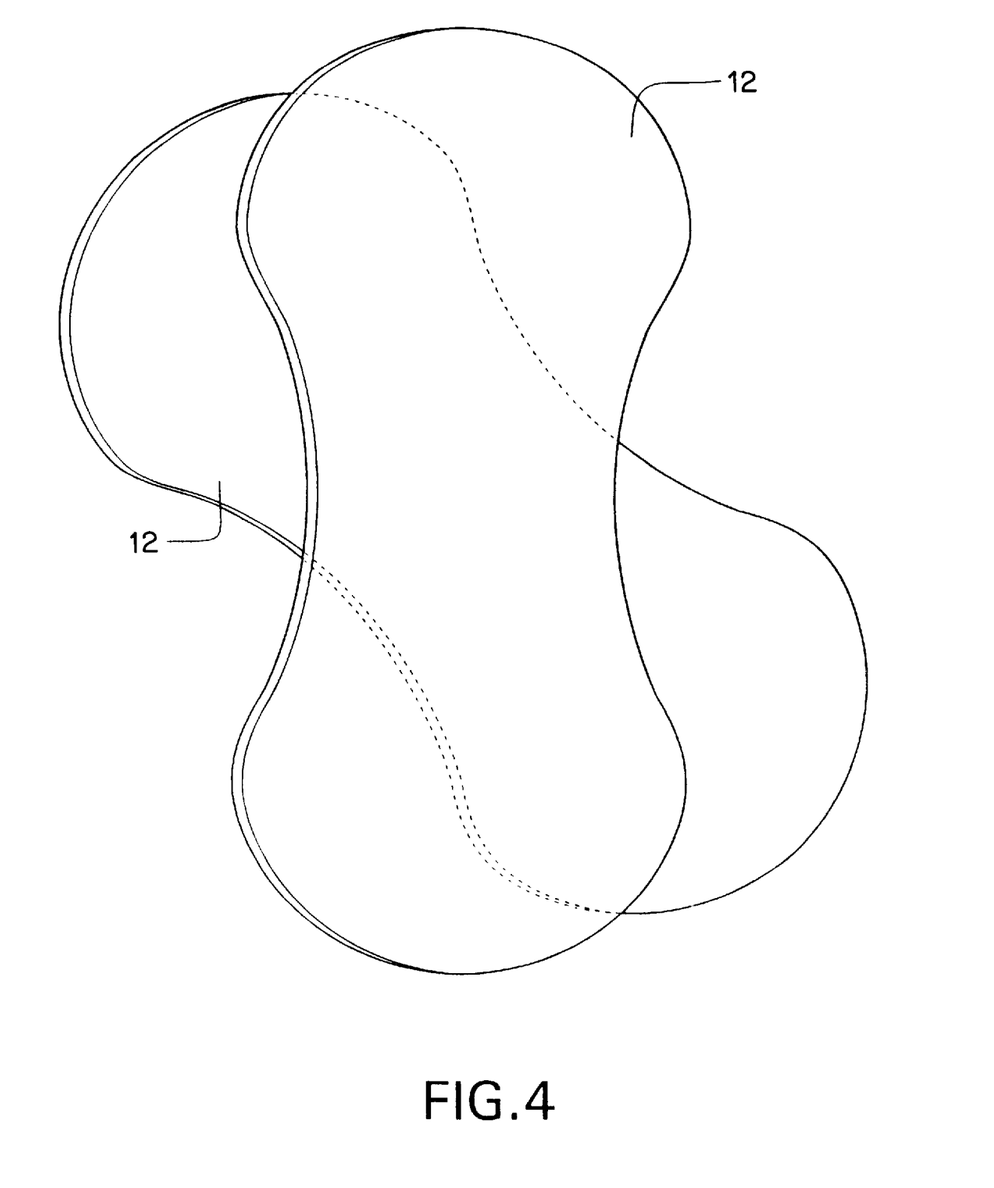
FIG. 4) is an off-set frontal-end view of two stirrers indexed at 45°.
Figure 5:
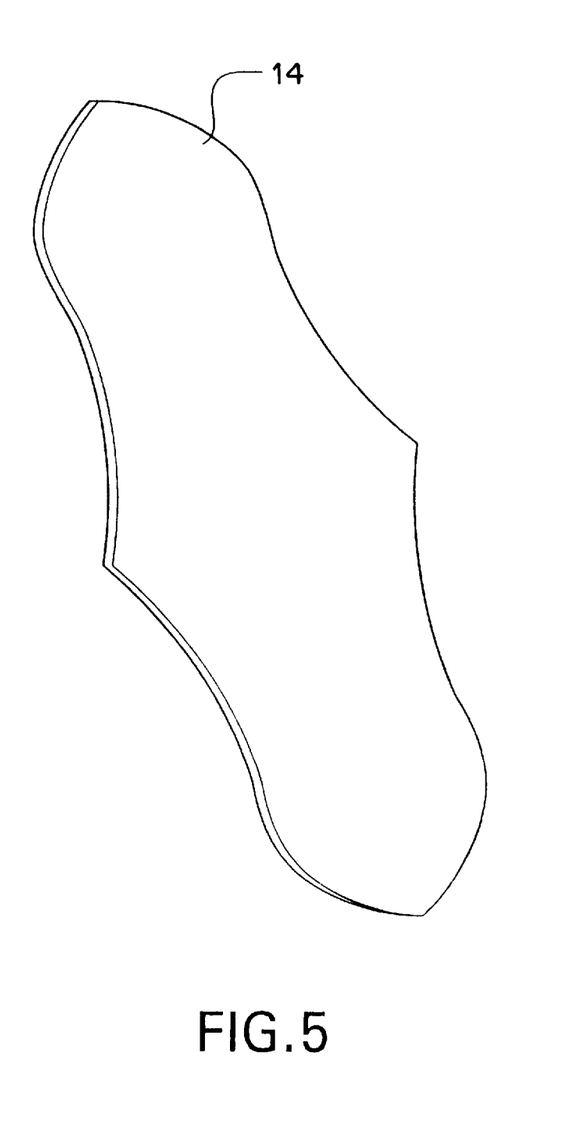
FIG. 5) is an off-set front and end view of the spacer employed when employing 45° stirrer indexing.

Although the spacers 14 shown in each of FIGS. 2 and 3 are generally quadrilateral in shape, the actual shape depends upon the indexing of each stirrer 12 on the same shaft. Turning to FIG. 4, there is shown a pair of stirrers 12 each of which are indexed 45° relative to one another. The shape of the spacer is the shape of the overlapping area of two adjacent stirrers 12 as shown in FIG. 5.

Figure 6:
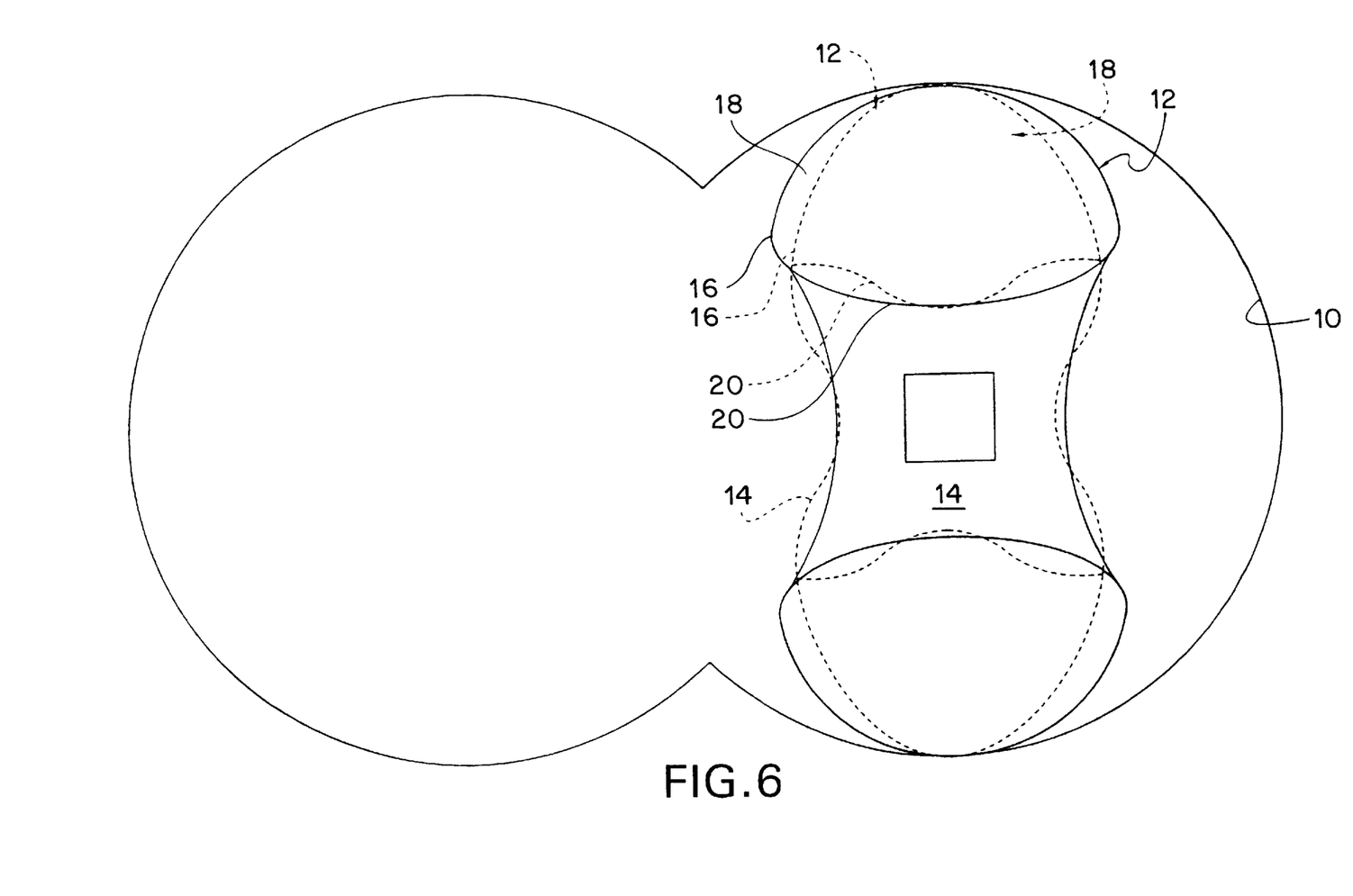
FIG. 6) is a cross sectional end view of both the involute and the cycloid stirrers overlapped for comparison of profile shape.

When comparing the geometric profile of each of the stirrers 12 shown in FIGS. 2 and 3, and when noting that one of the aims of the present invention is to maximize the surface area of the components which contact the liquid (or more correctly, the surface area of the formed films), it is clear that the cycloid profile possesses greater surface area as compared to the involute stirrer 12, as shown in FIG. 6. The cycloid stirrer 12 (shown in solid line) provides nearly 18% more liquid contacting surface area than a corresponding involute stirrer (shown in dotted line). Of significance is the effect of the spacer profile of the cycloid spacer versus the involute spacer. Specifically, the face 18 of stirrer 12 in FIG. 2 is larger than the face 18 of the stirrer 12 in FIG. 3, because the spacer 14 in FIG. 2 does not cover as much area as in FIG. 3. This is also illustrated in FIG. 6. Note that both the cycloid stirrer 12 and the involute stirrer shown in FIG. 6 illustrates that each profile fits within the reactor 22 and specifically within the inner contact surface 10.

Figure 7:
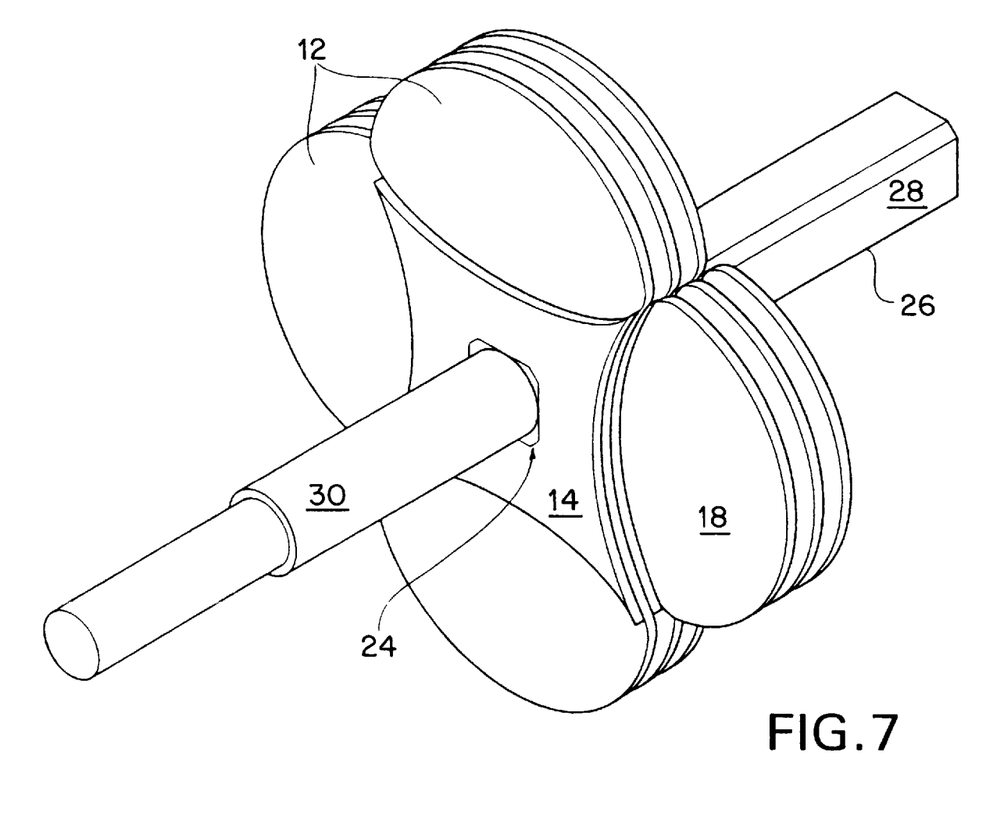
FIG. 7) is a perspective view of one shaft with several stirrers and spacers mounted thereon in which the stirrers are indexed 90° from one another.

As illustrated in FIG. 7, a plurality of stirrers and spacers are mounted for rotation on shaft 26. Each reactor actually has two shafts 26. Each shaft 26 may be a quadrilateral in cross-section for that portion 28 within the reactor upon which are mounted stirrers and spacers, while the portion 30 of the shaft projecting through and outside of the reactor maybe preferably be a different shape, such as cylindrical so that it can easily accommodate conventional seals and bearings (not shown and not a distinguishing feature of the present invention). The stirrers 12 shown in FIG. 7 indicate the 90° indexing. The 90° indexing of the cycloid stirrers 12 as they rotate is more clearly shown in FIG. 8. To produce the close tolerances of the present invention, preferably reactor 22 is two longitudinally intersecting cylindrical chambers 32 and 34. Thus the inner contact surface 10 of either cylindrical chamber 32, 34 of the reactor 22 has a diameter which is slightly larger than the length of a stirrer 12. While FIGS. 6 and 8 show only two intersecting cylinders, it is obvious that the reactor could comprise three or more intersecting cylinders, with each cylindrical chamber having a shaft, and stirrers and spacers mounted thereon. When more than two cylinder chambers are employed, at least two of the shafts rotate similarly. Preferred is a two cylinder chamber.

FIG. 8 also illustrates the progression of a pair of stirrers 12, one within each cylindrical chamber 32, 34 as the rotation of shafts 26 (not shown) proceeds, at 0°, 20°, 40°, 60° and 80°. Note that the direction of rotation (as indicated in the 0° position) is such that the shafts rotate in opposite directions, at the same rotational speed, whereby the stirrers 12 travel toward one another in the bottom of the reactor 22. While it is contemplated that the shafts can be rotated whereby the stirrers 12 travel away from one another in the bottom of reactor 22, the direction discussed previously, and illustrated in both FIGS. 8 and 9 is preferred. Both FIGS. 8 and 9 clearly illustrate the intermeshing of the stirrers on one shaft with those on the other shaft. In other words, the stirrers on one shaft are in the same plane as the stirrers on the other shaft, but are positioned or indexed in a different manner.

Figure 9:
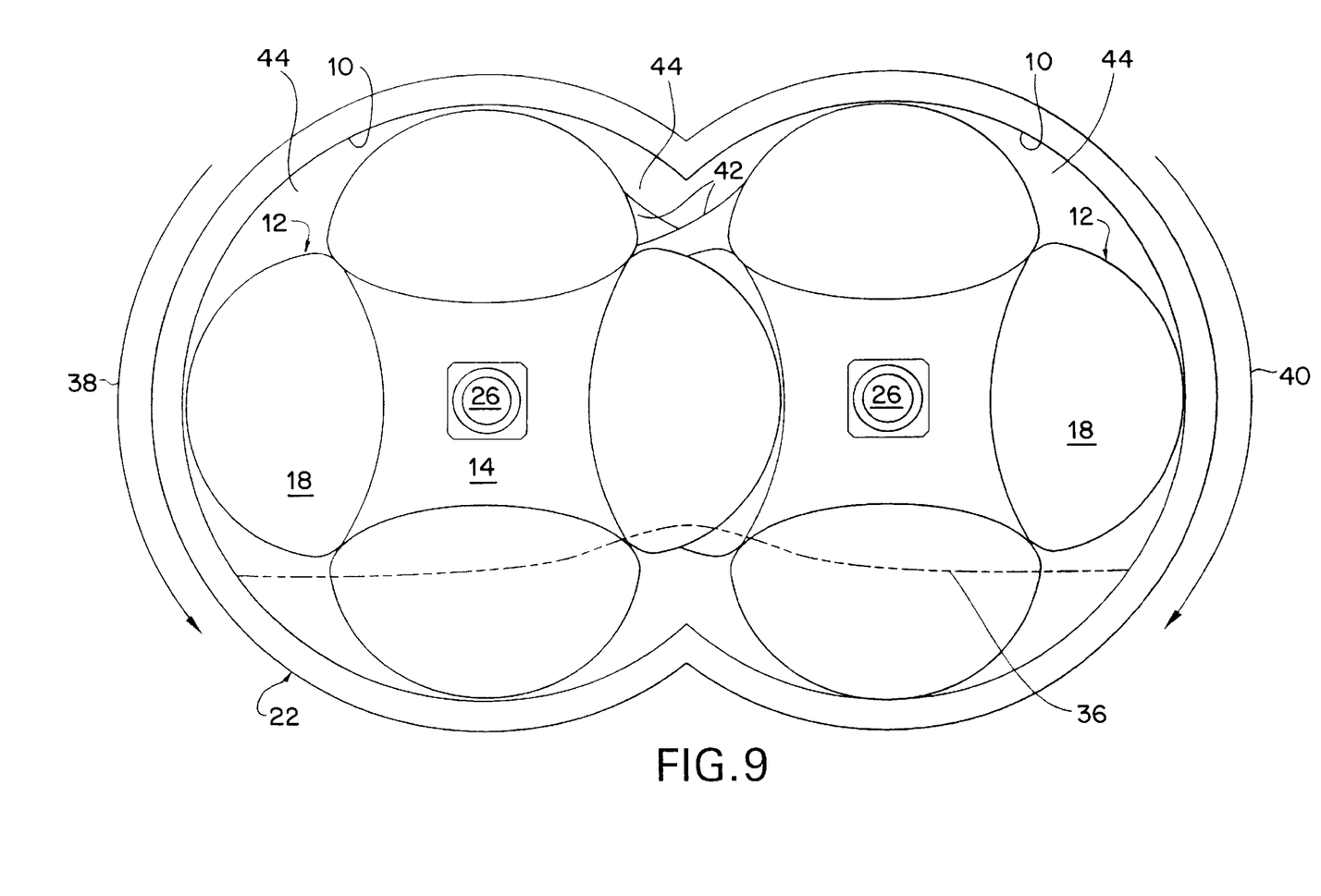
FIG. 9) is a cross-sectional end view through the middle of the reactor with two parallel shafts and the profiles of the stirrers and the polymer pool level and vapor paths being clearly illustrated.

In FIG. 9, the polymer pool level 36 is shown. The rotation of each shaft 26 is illustrated by arrow 38 and 40. Depending on the polymer fluid mechanics, it can generally be stated that the central portion of the polymer pool 36 is actually higher than other portions which is caused by the rotation of the shafts 26 and the lifting of the polymer by the multitude of stirrers 12. Also note, that as each stirrer 12 rotates from the position shown in FIG. 9 in the directions illustrated by arrows 38 and 40, a thin film of polymer 42 is produced in the central most portion of the reactor 22 above the polymer pool 36. This polymer film 42 increases the thin film surface area of the reactor thus maximizing the surface area to volume ratio of the reactor. Also illustrated in FIG. 9 are various vapor flow paths 44 which allow for the volatile vapor to be removed from the reactor 22 through outlet 50 (see FIG. 10). Since the inner contact surface 10 of the reactor 22 is wiped with every rotation of shafts 26 (with stirrers 12), these vapor paths do not have any buildup of polymer to block the vapor path.

Figure 10:
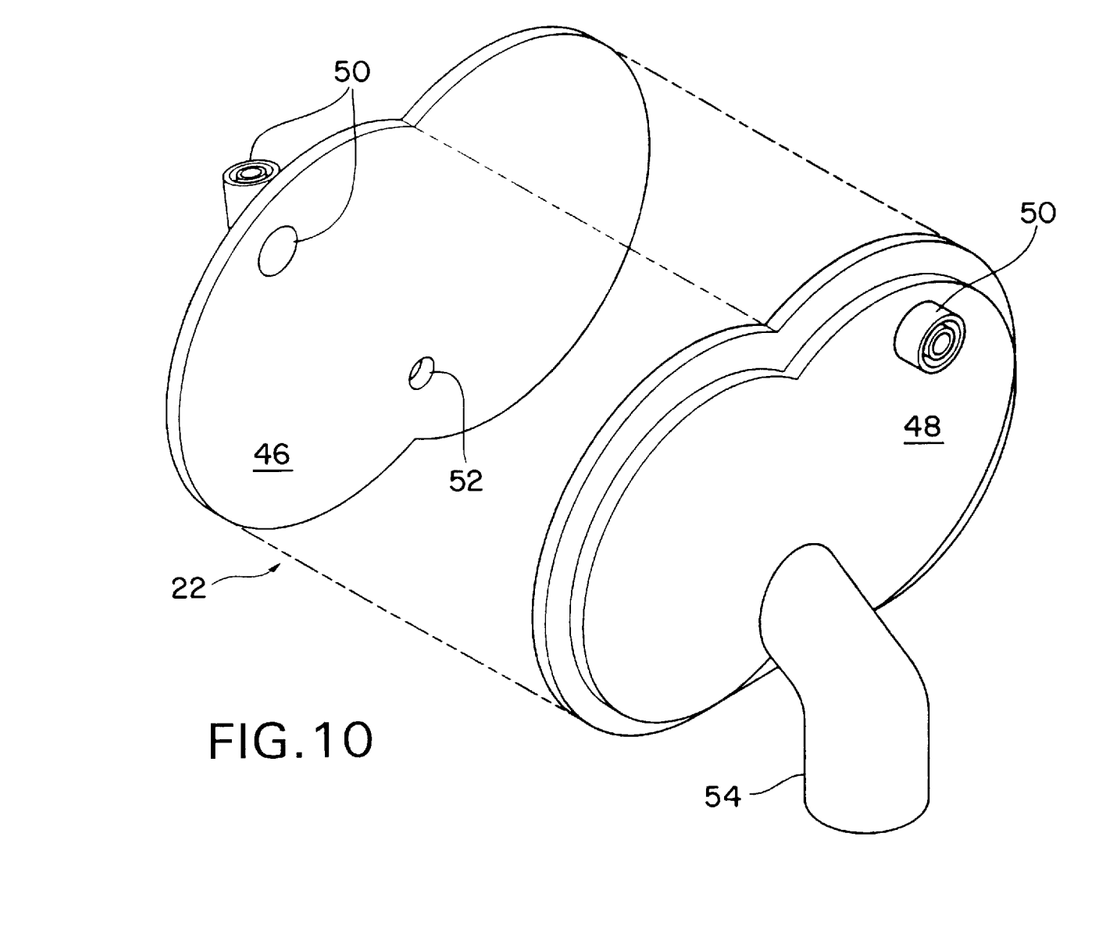
FIG. 10) is a perspective view of the end covers for the reactor of the present invention.

FIG. 10 illustrates the reactor end plates 46 and 48. Each end plate 46 and 48 has a vapor takeoff or vapor outlet 50, although one may be sufficient that spans both cylindrical chambers 32 and 34, on the top of the reactor near the outlet end (not shown). When comparing FIGS. 9 and 10, note that one of the vapor outlets 50 is positioned on the upper left-back side of the reactor 22, while the other vapor takeoff outlet 50 is positioned on the upper right-front side of the reactor. While the vapor outlet(s) 50 can be positioned anywhere within the top most portion of the reactor, having the outlets in the end plates 46, 48 is convenient for fabricating the reactor. In addition to the two vapor outlets 50, end plate 46 has a polymer inlet orifice 52, and end plate 48 has a polymer outlet 54. The low viscosity polymer arrives through inlet 52 and exits as a high viscosity polymer through outlet 54.

Figure 11:
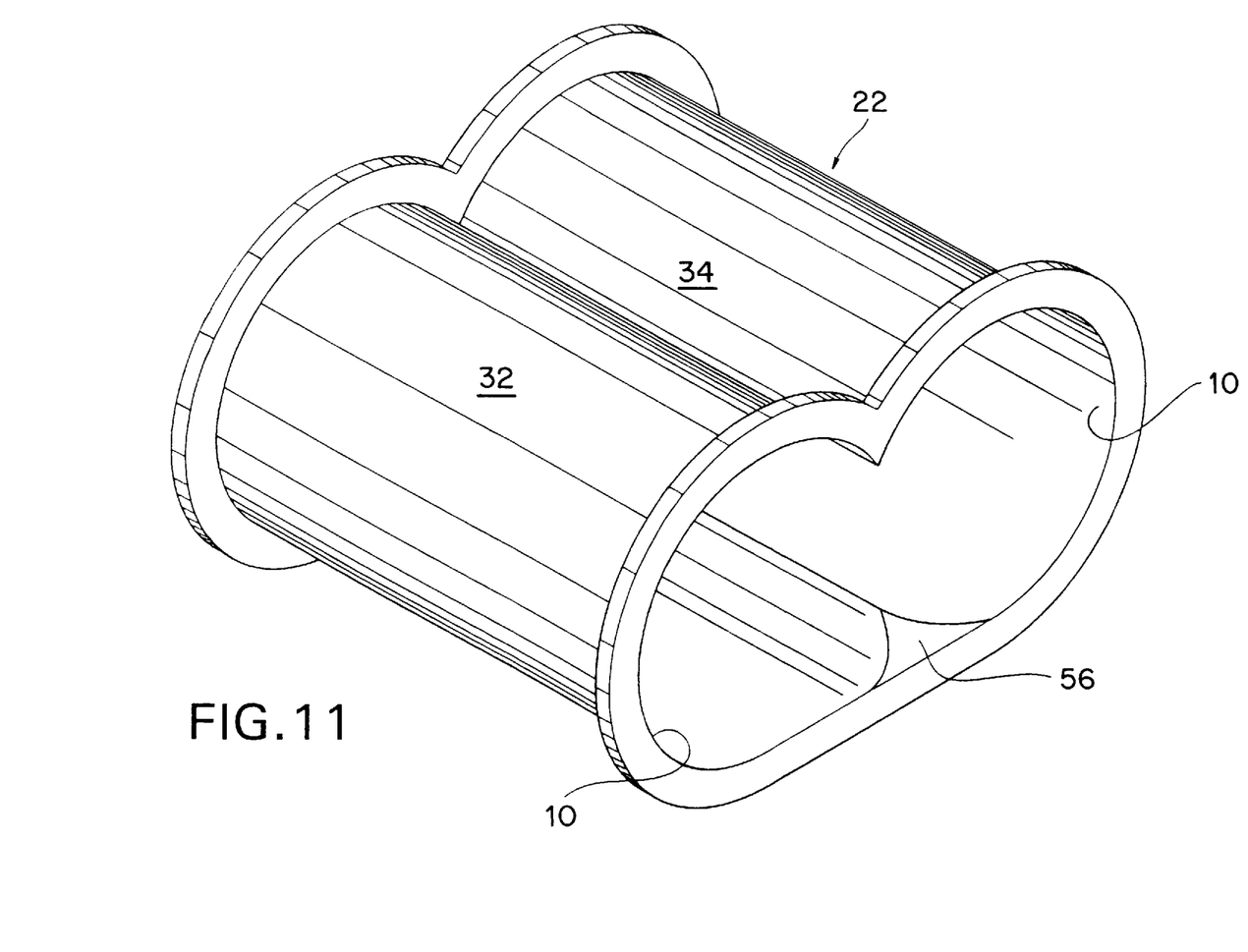
FIG. 11) is a perspective view of the reactor shell illustrating the deviation for drainage of the polymer from the reactor.

FIG. 11 illustrates the intersecting cylindrical chambers 32, 34 of the reactor 22 and clearly illustrates a small deviation 56 which is the only surface within the reactor 22 which is not wiped to the same degree as the remaining polymer within the reactor. This deviation 56 is at the outlet end of the reactor and permits the draining of the reactor 22 from the lowest point of each cylinder as is clearly shown in FIG. 11. It is likewise possible, however, to omit deviation 56 shown in FIG. 11, and instead have dual polymer outlets in end plate 48 capable of completely draining the lowest part of each cylindrical chamber 32, 34 of the reactor 22.

In operation, low viscosity polymer or monomeric material is introduced into the reactor 22 through the polymer inlet 52 and high viscosity polymer is removed from outlet 54. The amount of polymer exiting through outlet 54 is controlled in such a way as to produce a polymer pool 36. Each shaft 26 is rotated at the same speed and preferably in the direction shown by arrows 38 and 40 in FIG. 9. In this manner, each stirrer rotates in the same direction, at the same rational speed, as the shaft upon which it is secured, and wipes the inner wetted surface 10 of the reactor 22 exposed to the liquid polymer. Additionally, the rotation of the stirrers contact the polymer and pull it upwardly out of the pool of liquid 36 into a thin film on the face 18 of each stirrer 12, as well as on the inner contact surface 10 of the reactor 22. The thin film of polymer easily permits the volatile component (generally ethylene glycol and/or water when polyethylene terephthalate is the polymer, for example) to escape from the polymer, quickly, especially when the reactor is at an elevated temperature (sufficiently high to keep the polymer in liquid form, and yet not so high as to scorch, burn, or otherwise degrade the polymer. Likewise, it may be preferable to introduce a vacuum through the vapor outlets 50 to further increase the removal rate of the volatile component. As each stirrer pulls away from its corresponding adjacent stirrer, an additional thin polymer film surface is produced as illustrated by 42 in FIG. 9. This further increases the polymer film surface area to reactor volume ratio. However, this polymer film is substantially reduced if the shafts 26 and the stirrers 12 are rotated at a very low rate, or are rotated in any other combinations of rotational directions. Contrarily, if the shafts and stirrers are rotated at very high speeds, the polymer is slung throughout the entire reactor and potentially blocks the vapor flow path 44, thus defeating the ability of the reactor to remove the volatile component and thereby defeating the ability of the reactor to increase the viscosity. The optimum rotational speed of the shafts must be determined based upon the polymer employed, the viscosity of the polymer as it is introduced into the reactor, as well as the viscosity of the polymer exiting the reactor, the temperature of the reactor, etc. Generally, the rotational speed will be between 1–10 rpm (revolutions per minute) and more preferably about 3–5 rpm.

Although the spacing between the peripheral edge 16 of the stirrers and the inner surface 10 of the reactor can vary depending on the operating conditions of the reactor, the polymer employed, the fluid mechanics of the polymer at operating conditions (for example viscosity), the mechanics of manufacturing and operational tolerances, etc., it is generally believed that the spacing can be between about 1–10 mm, preferably 1–3 mm. Likewise the spacing between the peripheral edges 16 of adjacent stirrers on different shafts is within the above range. Lastly, the spacer thickness and the thickness of the stirrers is also within the above stated range. Again, all spacing is dependent upon the conditions mentioned above. The requirements may result in deviations of the cycloid or involute profiles, or incorporation of other conic curves at any one or all of the clearances mentioned.

Thus it can be seen with the rotation of the shafts in opposite directions at the same rotational speed, the perimeter edge 16 of each group of stirrers 12 wipes a portion of the inner contact surface 10 of the reactor 22 leaving a portion where the spacers are, which is not wiped by the perimeter edges of the stirrers. However, due to the proximity of the adjacent stirrers 12 and the rotation thereof, the fluid mechanics of the polymer wipes the remaining inner contact surface 10 not wiped by the perimeter edge 16 of a stirrer 12. The faces 18 of each stirrer 12 are wiped by adjacent stirrers on the adjacent shaft, and the spacer edges 20 are also wiped by fluid mechanics of the polymer on the peripheral edge 16 of an adjacent stirrer on the adjacent shaft. Additionally, as the faces 18 of the stirrers pass through the polymer pool 36, the drag on the faces by the polymer also serves to wipe the faces. Lastly, the deviation 56 is wiped by action of the flowing polymer out of the reactor 22 through outlet 54. Thus, all interior "wetted" surfaces of the reactor are wiped with each rotation of each shaft, thus renewing the thin film formation with each wiping action.

The polymer film surface area generated to reactor volume ratio is maximized with the present invention because the spacer thickness is the thinnest possible which still permits polymer to adequately wet-out on each face 18 of the stirrers 12; as well as manufacturing the stirrer thickness as thin as structurally possible, considering the reactor operating conditions. By creating many thin films of polymer on all interior surfaces within the reactor, the volatile component evaporates or flashes-off quickly, under the operating conditions of the reactor. Thus the reactor of the present invention maximizes the surface area compared with prior wiped-wall type reactors, yielding high efficiency in converting low viscosity liquid to relatively high viscosity polymer. For example, PET entering reactor 22 may have an I.V. (intrinsic viscosity) from about 0.40 to 0.65, and exit the reactor with an I.V. of 0.90–1.15, depending on the operating conditions of the reactor and the polymer employed (I.V. measured at 25° C. in orthophenolchloride).

Thus it is apparent that there has been provided with accordance with the invention a reactor that fully satisfies the object, aims, and the advantage as set forth above. While the invention has been described in conjunction with specific embodiments thereof, it is evident that many alternatives modifications and variation will be apparent to those skilled in the art such as those set forth in FIG. 11 or wrapping the reactor in a jacket to heat or cool it as it generally known, and or to make each shaft 26 hollow so that a heating/cooling medium can be introduced there through to heat/cool the shaft, stirrers and spacers, and others apparent to those skilled in the art in light of the foregoing description.

Accordingly, the present invention is intended to embrace such alternatives, modifications, and variation that falls within the spirit and board scope of the present invention.

What is claimed is:

1. A reactor comprising:

a) a substantially horizontally extending chamber for polycondensation of a polymer, said chamber having interior surfaces including an inlet end and an outlet end;

b) at least one inlet at said inlet end of said chamber for introducing a low viscosity polymer into said chamber;

c) at least one outlet at said outlet end of said chamber, for discharging a high viscosity polymer from said chamber;

d) at least one outlet in said reactor communicating with said chamber for exhausting vapor;

e) at least two rotatable shafts, mounted in said chamber, substantially horizontally and extending the length of said chamber;

f) a plurality of stirrers mounted on each of said shafts;

g) a plurality of spacers for spacing apart each stirrer on each of said shafts such that said stirrers on one shaft intermesh with said stirrers on another shaft; and whereby said stirrers are shaped so as to constantly wipe said interior surfaces of said chamber upon rotation of said shafts, as well as wipe said plurality of adjacent spacers, as well as wipe each adjacent intermeshed stirrer.

2. The reactor of claim 1, whereby said plurality of stirrers are shaped as a cycloid.

3. The reactor of claim 1, whereby said plurality of stirrers are shaped as an involute.

4. The reactor of claim 1, wherein said chamber is at least two longitudinally overlapping cylindrical chambers.

5. The reactor of claim 1, wherein each of said plurality of stirrers comprises four contact faces.

6. The reactor of claim 5, wherein each of said stirrers is indexed 90° from its adjacent stirrer, on the same shaft.

7. The reactor of claim 6, wherein each of said spacers is shaped in cross-section the same as the cross-section of two overlapping stirrers.

8. The reactor of claim 5, wherein each of said stirrers is indexed 45° from its adjacent stirrer, on the same shaft.

9. The reactor of claim 1, wherein said two rotatable shafts rotate in opposite directions.

10. The reactor of claim 9, wherein said shafts rotate such that said stirrers move toward one another in the bottom of said chamber.

11. The reactor of claim 9, wherein said two shafts are positioned in said chamber such that said stirrers intermesh with one another, thus wiping said front and back surfaces of each contact face.

12. The reactor of claim 10, wherein said rotation of said shafts is such that a thin film of polymer is formed when said stirrers rotate away from one another at the top of said chamber.

13. The reactor of claim 1, wherein said plurality of spacers on one shaft are in the same plane as said plurality of spacers on an adjacent shaft.

14. The reactor of claim 13, wherein said plurality of stirrers on one shaft are in the same plane as said plurality of stirrers on an adjacent shaft.

* * * * *